(12) United States Patent
Kim et al.

(10) Patent No.: US 8,684,587 B2
(45) Date of Patent: Apr. 1, 2014

(54) BACKLIGHT UNIT

(75) Inventors: Hee-Cheoul Kim, Gyeonggi-do (KR);
Ji-Geun Nam, Seoul (KR);
Choun-Sung Kang, Gyeonggi-do (KR);
Jin-Taek Choi, Gyeonggi-do (KR);
Sang-Hyun Ahn, Gyeonggi-do (KR);
Jong-Bum Choi, Gyeonggi-do (KR);
Seung-Soo Yang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 358 days.

(21) Appl. No.: 12/648,904

(22) Filed: Dec. 29, 2009

(65) Prior Publication Data

US 2011/0013376 A1    Jan. 20, 2011

(30) Foreign Application Priority Data

Jul. 16, 2009 (KR) .................. 10-2009-0064801

(51) Int. Cl.
*F21V 7/04* (2006.01)

(52) U.S. Cl.
USPC ..................... 362/628; 362/615; 362/616

(58) Field of Classification Search
USPC ................................ 362/600–634
See application file for complete search history.

(56) References Cited

U.S. PATENT DOCUMENTS

| | | | | |
|---|---|---|---|---|
| 6,241,358 B1* | 6/2001 | Higuchi et al. | | 362/613 |
| 2006/0002146 A1* | 1/2006 | Baba | | 362/613 |
| 2006/0028842 A1* | 2/2006 | Kim et al. | | 362/612 |
| 2006/0158901 A1* | 7/2006 | Wang | | 362/612 |
| 2009/0196071 A1* | 8/2009 | Matheson et al. | | 362/623 |
| 2010/0002169 A1* | 1/2010 | Kuramitsu et al. | | 349/65 |

FOREIGN PATENT DOCUMENTS

| | | |
|---|---|---|
| CN | 1716042 | 1/2006 |
| CN | 1731254 | 2/2006 |
| CN | 101300452 A | 11/2008 |
| CN | 101389898 | 3/2009 |
| JP | 2007188876 A | 7/2007 |
| KR | 1020060049253 A | 5/2006 |
| KR | 1020090073451 A | 7/2009 |
| WO | 2005090855 A1 | 9/2005 |
| WO | WO 2008/133421 | 11/2008 |

* cited by examiner

*Primary Examiner* — William Carter
(74) *Attorney, Agent, or Firm* — Morgan, Lewis & Bockius LLP

(57) ABSTRACT

A backlight unit is capable of preventing generation of mura such bright lines and dark lines. The backlight unit includes a light guide panel divided into a plurality of light guide blocks for local dimming driving, a first block partitioning unit formed as a groove between respective adjacent light guide blocks on a lower surface of the light guide panel, and a point light source received in the first block partitioning unit.

9 Claims, 14 Drawing Sheets

BACKLIGHT UNIT

This application claims the benefit of the Korean Patent Application No. P09-0064801, filed on Jul. 16, 2009, which is hereby incorporated by reference as if fully set forth herein.

BACKGROUND OF THE INVENTION

1. Field of the Invention

The present invention relates to a backlight unit for a liquid crystal display (LCD) device, and more particularly, to a backlight unit that is capable of minimizing generation of mura such as bright lines and dark lines in the LCD device.

2. Background of the Related Art

In general, a liquid crystal display (LCD) device, which is one of flat panel display devices, displays images using liquid crystal. The LCD is widely used in almost every field of industry because it is thin and light compared to other display devices and is able to operate with a low driving voltage and low power consumption.

The LCD device belongs to non-luminous devices because it has an LCD panel that does not emit light by itself. Accordingly, the LCD device usually requires a backlight unit to supply light thereto. FIG. 1 is a sectional view schematically illustrating a backlight unit according to the related art. As shown in FIG. 1, a backlight unit has a light source 2 to drive displaying areas in a segmental manner according to the related art. Corresponding to the light source 2, the backlight unit also has a light guide panel that is separated horizontally and vertically into a plurality of light guide blocks 4. The light guide blocks 4 are assembled in a vertical direction and a horizontal direction through connection screws or connection bolts. However, such a structure arrangement brings about a disadvantage in that the light guide blocks 4 may frequently be distorted during an assembling process. In addition, as the number of the light guide blocks 4 is increased, the time for the assembling process is increased as well.

Further, in such-an assembled backlight unit, border parts are generated in horizontal and vertical directions among the respective light guide blocks 4. In each border part, a problem occurs in that part of light advancing from an incident part to an anti-incident part is not incident to a next light guide block 4, but is refracted or reflected, thereby generating mura such as bright lines and dark lines in horizontal and vertical directions in the LCD device.

SUMMARY OF THE INVENTION

Accordingly, the present invention is directed to a backlight unit for a liquid crystal display (LCD) device that substantially obviates one or more problems due to limitations and disadvantages of the related art.

An embodiment of the present invention provides a backlight unit that is capable of minimizing generation of mura such as bright lines and dark lines in the LCD device.

Additional advantages, objects, and features of the invention will be set forth in part in the description which follows and in part will become apparent to those having an ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit includes a light guide panel, at least one first block partitioning unit formed as a groove on a lower surface of the light guide panel, a plurality of light guide blocks formed by partitioning the light guide panel, and at least one point light source received in the at least one first block partitioning unit, and constituting one light block corresponding to one of the plurality of light guide blocks.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
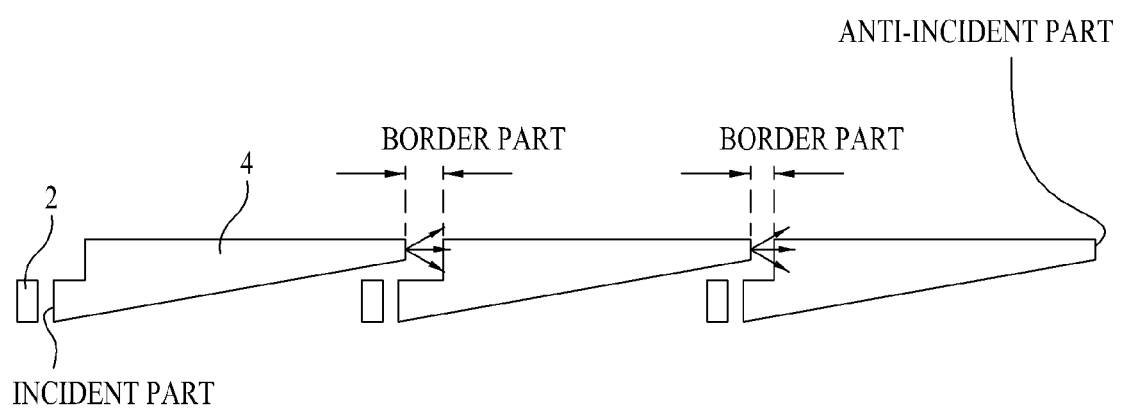
FIG. 1 is a sectional view schematically illustrating a backlight unit according to the related art.
Figure 2:
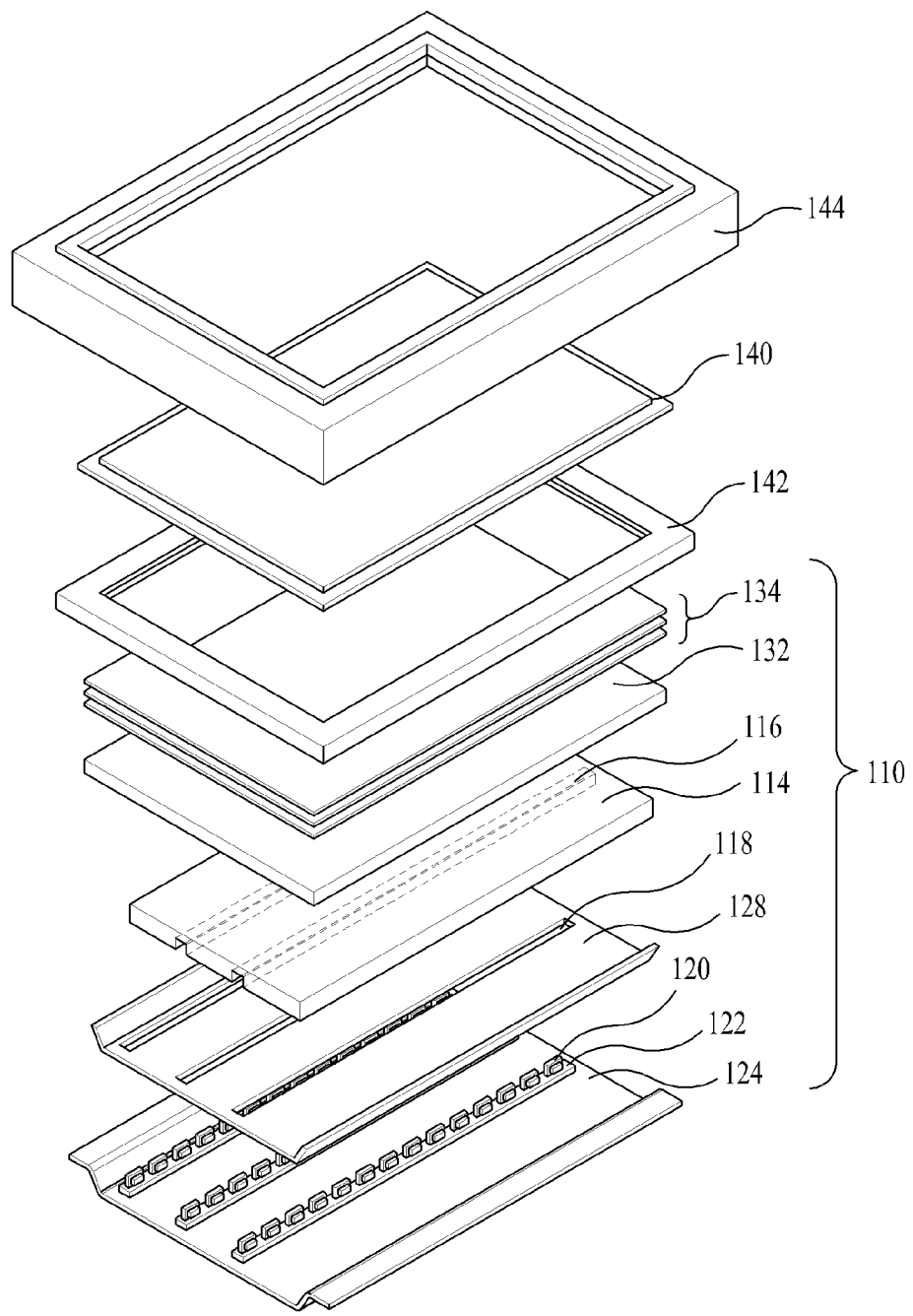
FIG. 2 is a perspective view schematically illustrating a liquid crystal display (LCD) module according to a first exemplary embodiment of the present invention.
Figure 3:
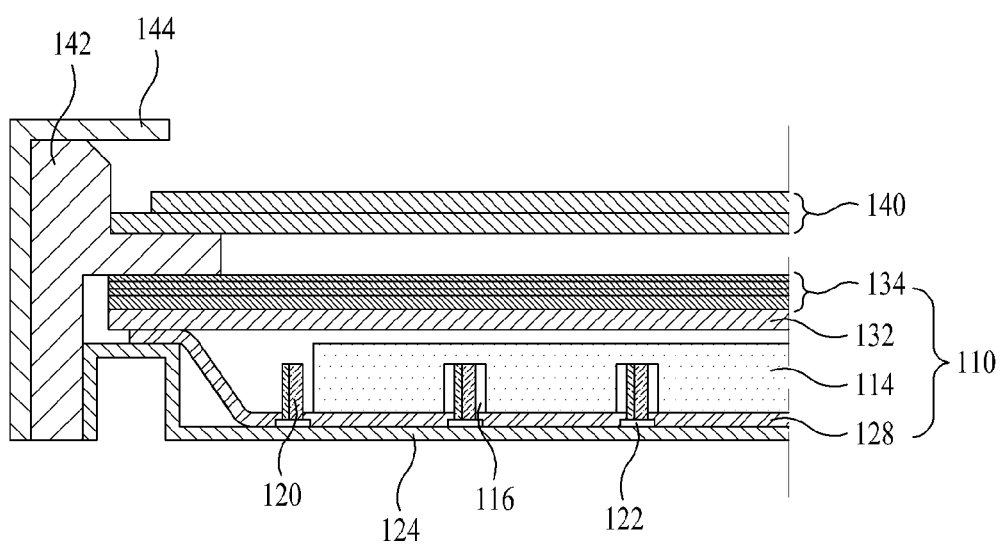
FIG. 3 is a sectional view schematically illustrating the LCD module of FIG. 2.

FIG. 2 is a perspective view schematically illustrating a liquid crystal display (LCD) module according to a first exemplary embodiment of the present invention. FIG. 3 is a sectional view schematically illustrating an LCD panel of the LCD module of FIG. 2. Referring to FIGS. 2 and 3, the LCD module may include an LCD panel 140, a backlight unit 110, a mold frame 142, a top case 144, and a bottom cover 124.

In the LCD panel 140, a plurality of liquid crystal cells (not shown) are arranged in an active matrix form, being disposed between upper and lower substrates. Each of the liquid crystal cells is equipped with a thin film transistor (TFT) for converting a video signal, and has a refractive index that varies according to the video signal, thereby displaying an image corresponding to the video signal.

The top case 144 may have a rectangular band form and may be configured to have a plane surface part and side surface parts perpendicular to each other. The top case 144 may be connected to lateral sides of the mold frame 142 while enclosing the periphery of the LCD panel 140. The bottom cover 124 may be connected to the mold frame 142, thereby covering a bottom surface of the backlight unit 110.

The mold frame 142 may be molded of plastic or aluminum alloy and may be configured to have a stepped surface along inner peripheral sidewalls thereof. A plurality of the LCD panels 140 are accumulated on the stepped surface of the mold frame 142.

The backlight unit 110 may include a plurality of point light sources 120, a light source substrate 122, a light guide panel 114, a reflection sheet 128, a diffusion plate 132, and a plurality of optical sheets 134.

The reflection sheet 128 may be disposed between the light guide panel 114 and the bottom cover 124 receiving the light source substrate 122 to prevent light generated from the point light sources 120 from being emitted to the bottom cover 124, thereby preventing light loss. Referring to FIG. 2, the reflection sheet 128 may include a receiving hole 118 formed corresponding to the point light sources 120 mounted on the light source substrate 122. The point light sources 120 are exposed to a first block partition unit 116 through the receiving hole 118.

The plurality of optical sheets 134 diffuse and focus the light emitted from the light guide panel 114, and convey the light to the LCD panel 140 after improving the luminance efficiency of the light by increasing brightness. Also, the plurality of optical sheets 134 may include a light condensing sheet, a diffusion sheet and a polarizing sheet such as a dual brightness enhancement film (DBEF).

The point light sources 120 may be mounted on the light source substrate 122 and supplied with power from an external power source to generate light. As shown in FIG. 3, among the plurality of point light sources 120, some light sources 120 (only one is shown in FIG. 3 for explanation) most adjacent to the mold frame 142 may be disposed in a space formed between the reflection sheet 128 and the diffusion sheet 132 while the other light sources 120 are disposed in the first block partition unit 116. The point light sources 120 are side-view light sources that emit light in a direction parallel with the LCD panel of the LCD module of FIG. 2. Also, the point light sources shown in FIGS. 2 and 3 may include light emitting diodes (LEDs) to emit light toward incident parts. The incident parts are side surfaces of the respective light guide blocks 114.

Figure 4:
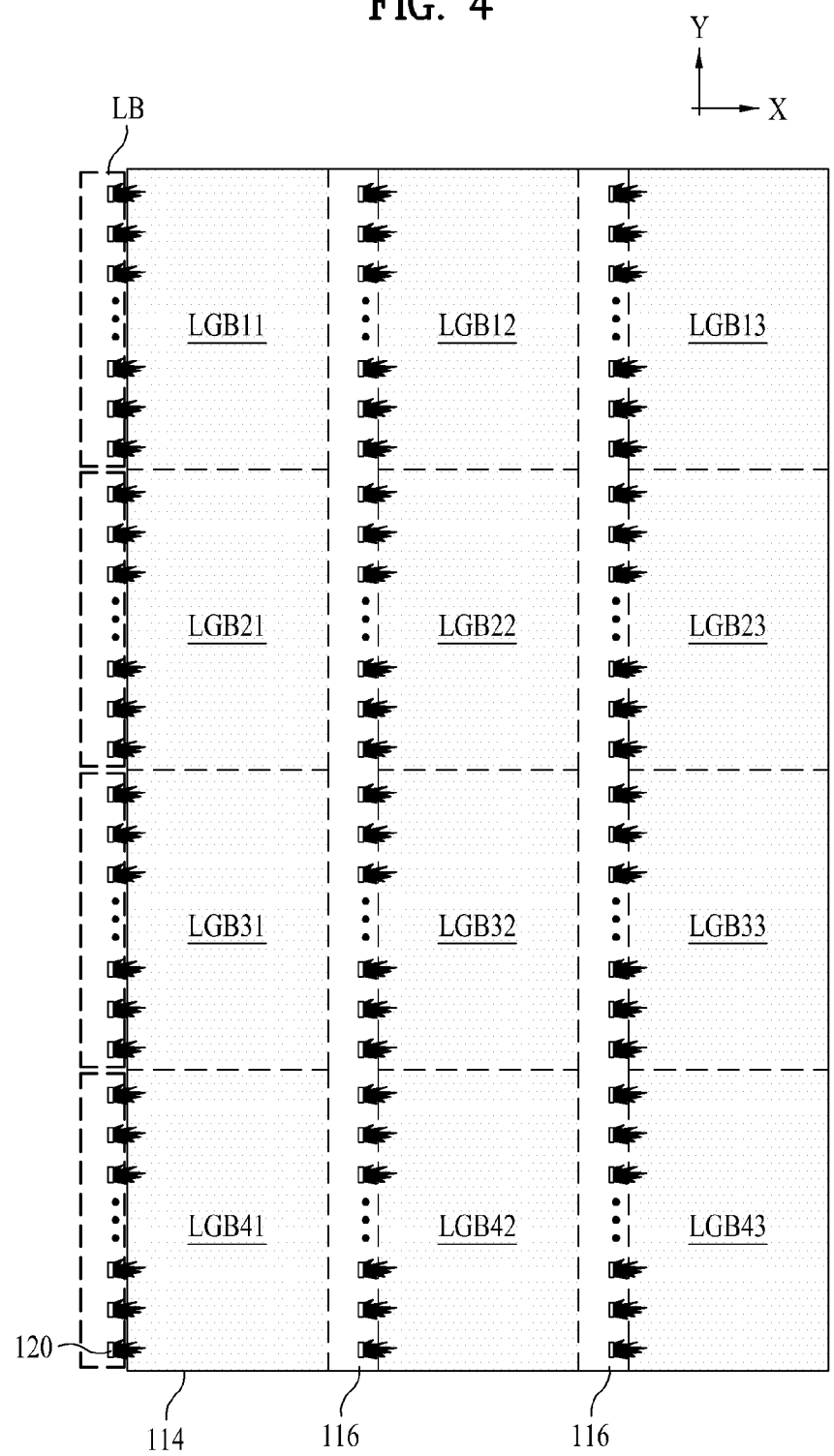
FIG. 4 is a plan view schematically illustrating a light guide panel of the LCD module of FIG. 2.

FIG. 4 is a plan view schematically illustrating the light guide panel 140 of FIG. 2. As shown in FIG. 4, the plurality of point light sources 120 may form one light source block (denoted by "LB") corresponding to the light guide block 114 (denoted by "LGB") one to one. In this exemplary drawing, each light source block LB is segment-driven according to a local dimming method such that, when any one of the plurality of light source blocks LB is turned on, the other light source blocks LBs are turned on by a lower brightness than the one light source block LB, or are completely turned off.

The plurality of point light sources 120 may be mounted on the light source substrate 122. The light source substrate 122 receives power from the external power source and supplies the power to the plurality of point light sources 120, thereby lighting up the point light sources 120. The light source substrate 122 may include a printed circuit board (PCB) or a flexible printed circuit (FPC). One light source block LB may be mounted in a one-to-one corresponding relationship with the light source substrate 122. Alternatively, a plurality of the light source blocks LB may be mounted on each light source substrate 122 in a multiple-to-one relationship.

The light guide panel 114 serves to guide the light being incident from the point light sources 120 to the LCD panel 140. Referring to FIG. 2 to FIG. 4, the first block partitioning unit 116 may have a groove shape that is formed on the lower surface of the light guide panel 114. The first block partitioning unit 116 has a space to dispose therein the point light sources 120 exposed through the receiving hole 118 of the reflection sheet 128.

FIG. 4 is a plan view schematically illustrating the light guide panel of the LCD module of FIG. 2. As shown in FIG. 4, a width direction of the first block partitioning unit 116 is parallel with a first direction X that is a light emitting direction of the point light sources 120. A length direction of the first block partitioning unit 116 is perpendicular to the light emitting direction. For example, the length of the first block partitioning unit 116 is extended in a second direction Y that is parallel with a gate line (not shown) of the LCD panel 140. The light guide panel 114 having the first block partitioning unit 116 may be fabricated by preparing a sheet of light guide panel through an injection molding or an extruding process, and forming a groove on the lower surface of the light guide panel 114 through a cutting process.

The light guide panel 114 may be just partitioned into the plurality of light guide blocks LGB by one or more block partitioning units 116, rather than separated into a plurality of parts as in the related art, for the local dimming driving. More specifically, the light guide blocks LGB i1, LGB i2, LGB i3, ... adjoining in the first direction X may be arranged in the form of a bar, being partitioned by the first block partitioning units 116 disposed among them. The light guide blocks LGB 1j, LGB 2j, LGB 3j, ... adjoining in the second direction Y may be integrally connected.

Figure 5:
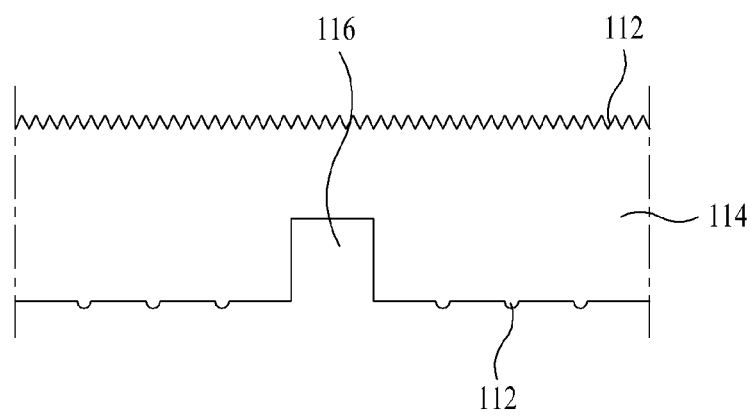
FIG. 5 is a sectional view schematically illustrating optical patterns formed on a front surface and a rear surface of the light guide panel.

FIG. 5 is a sectional view schematically illustrating optical patterns formed on a front surface and a rear surface of the light guide panel 114. In this exemplary case, as shown in FIG. 5, optical pattern 112 may include at least one of a dot pattern and a prism pattern, which may be formed on at least one of the front surface and the rear surface of the light guide panel 114 (or on at least one of the upper surface and the lower surface of the respective light guide blocks LGB). Straightness of the light incident to the light guide blocks LGB is improved by the optical patterns 112. The optical patterns 112 are not limited to the two patterns, and any pattern that can improve the straightness of the light incident to the light guide blocks LGB are applicable to the optical pattern 112. Accordingly, although the light guide blocks LGB 1j, LGB 2j, LGB 3j, ... adjoining in the second direction Y are not partitioned, the light that straightened by the optical pattern 112 are not incident toward the light guide blocks LGB 1j, LGB 2j, LGB 3j, ..., thereby preventing generation of mura such as bright lines and dark lines at board parts among the light guide blocks LGB 1j, LGB 2j, LGB 3j, . . . .

Figure 6:
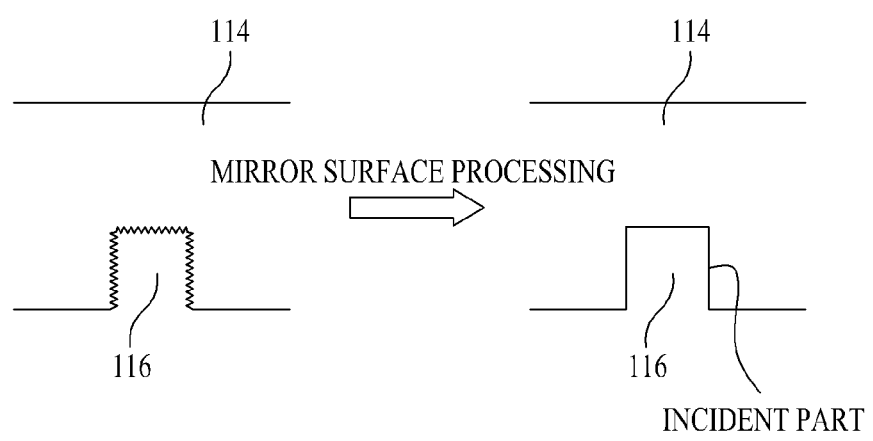
FIG. 6 is a sectional view schematically illustrating a mirror surface processing applied to a first block partitioning unit of FIG. 2.

FIG. 6 is a sectional view schematically illustrating a mirror surface processing applied to the first block partitioning unit 116. As shown in FIG. 6, the surfaces (left side of FIG. 6) of the light guide blocks LGB exposed by the first block partitioning unit 116 are planarized through the mirror surface processing, thereby improving the light incident efficiency. Since evenness of the surfaces of the light guide blocks LGB may be deteriorated due to the formation of the first block partitioning units 116, the light incident to the light guide blocks LGB may be diffused and fail to be incident to the incident part of the light guide blocks LGB, and therefore the mirror surface processing servers to improve the light incident efficiency as explained above.

Figure 7:
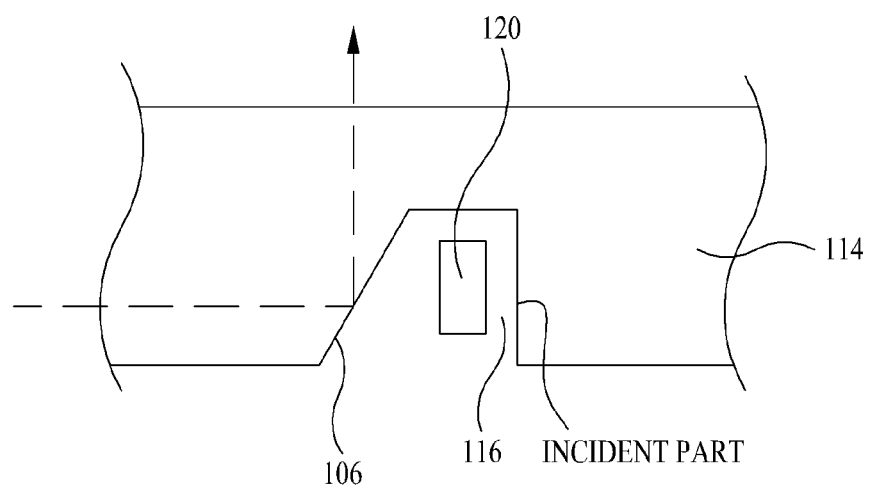
FIG. 7 is a sectional view schematically illustrating a first block partitioning unit having a slant surface, according to the first exemplary embodiment of the present invention.

FIG. 7 is a sectional view schematically illustrating the first block partitioning unit 116 according to the first exemplary embodiment. As shown in FIG. 7, the first block partitioning unit 116 may have a section that is a polygonal shape such as a triangle and a rectangle, a semicircular shape, or a circular shape. In particular, according to this exemplary embodiment, the section of the first block partitioning unit 116 may have a side surface 106. The side surface 106 may be slanted to face the incident part, out of side surfaces of the light guide panel 114 exposed by the first block partitioning unit 116. According to such an exemplary structure, the light advancing to an adjoining one of the light guide blocks LGB is reflected by the slant side surface 106 and is not incident to the adjacent light guide block LGB. As a result, bright lines or dark lines can be prevented from generating at the border parts among the light guide blocks LGB.

Moreover, the respective light guide blocks LGB are integrally connected rather than being separated by the first block partitioning units 116 disposed among them, thereby simplifying the process of assembling the light guide blocks LGB. As a result, the processing time can be reduced, and the light leakage caused by an assembling tolerance can be prevented. In addition, unlike the related art in which the border part in the form of a hole brings about the bright lines or dark lines, the first exemplary embodiment discloses the above structure that prevents the bright lines or dark lines from generating at the border part, thereby enhancing the image quality.

Figure 8:
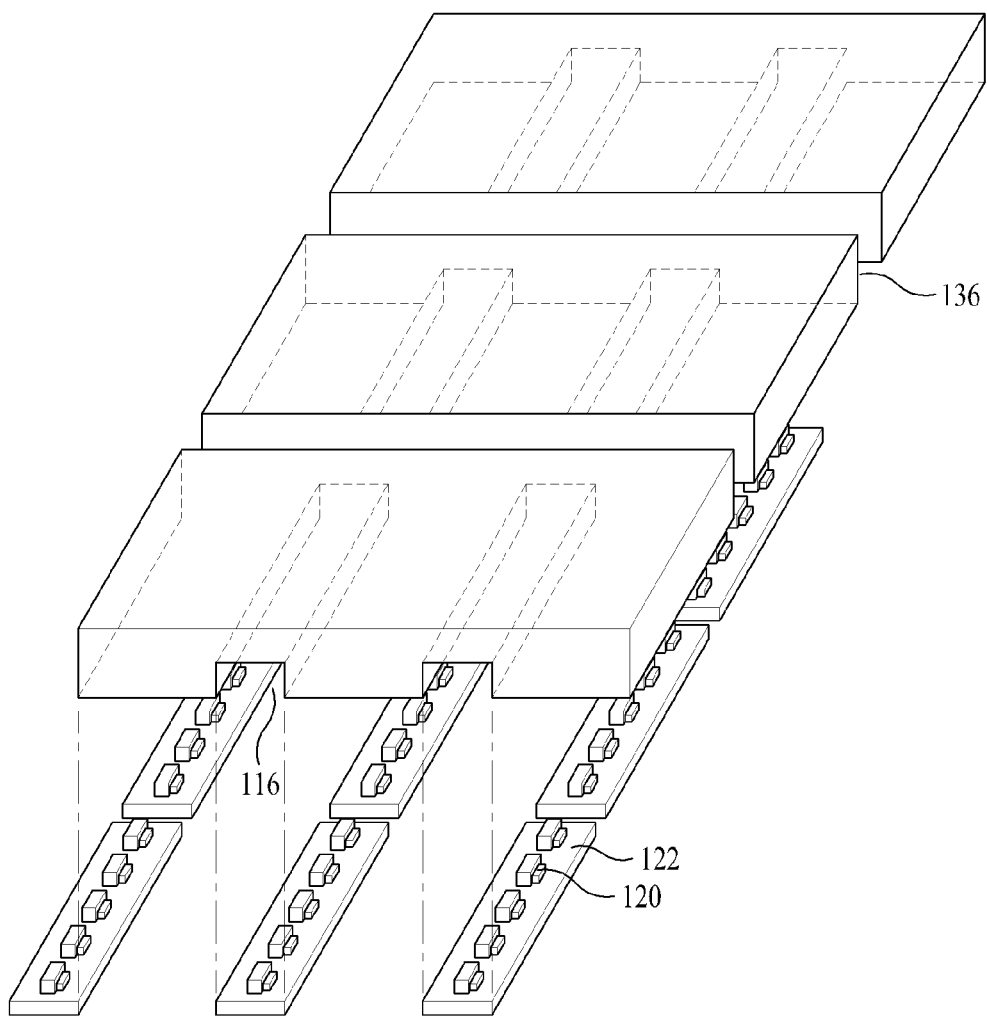
FIG. 8 is a perspective view schematically illustrating a backlight unit according to a second exemplary embodiment of the present invention.
Figure 9:
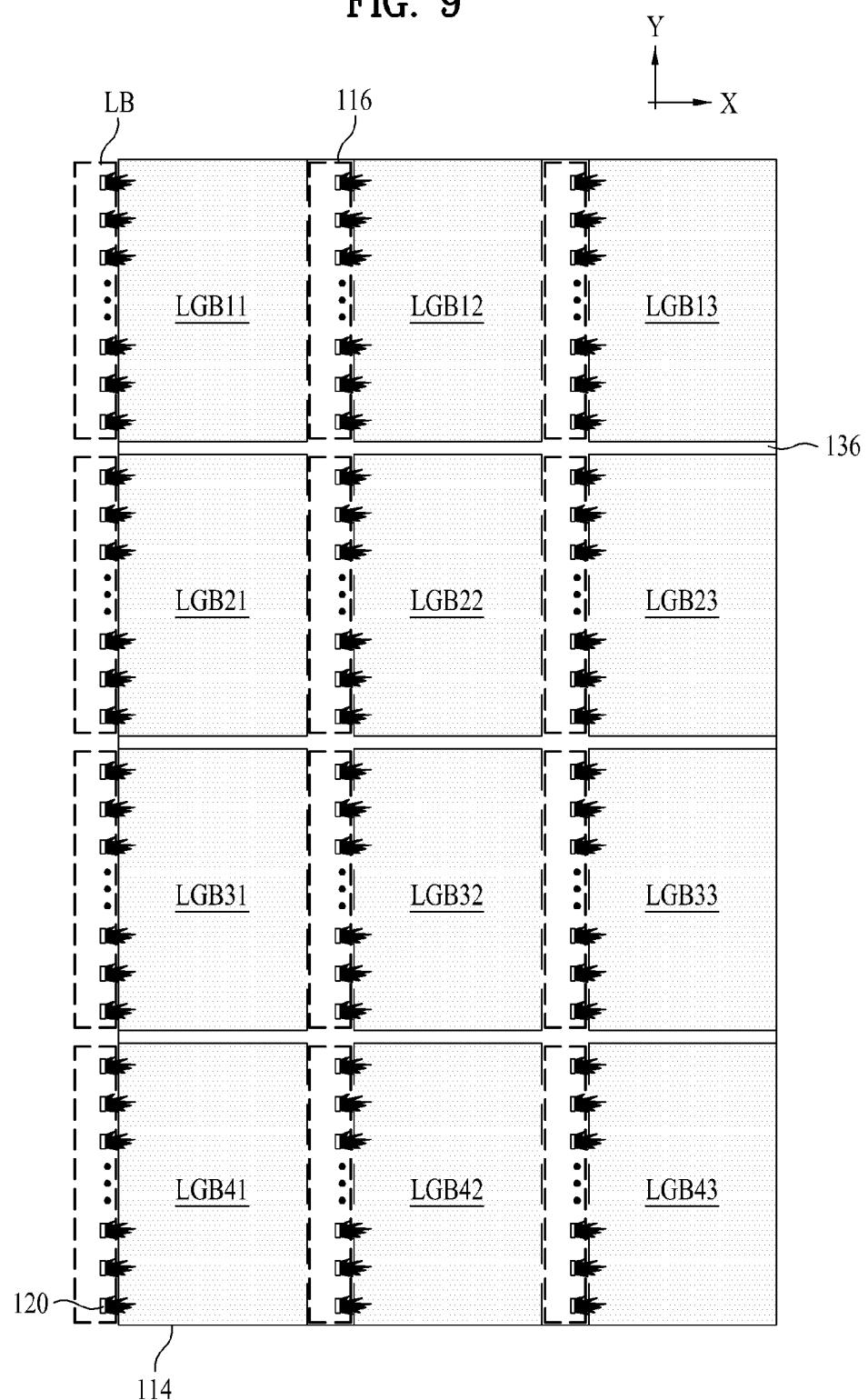
FIG. 9 is a plan view schematically illustrating a light guide panel of the backlight unit of FIG. 8.

FIG. 8 is a perspective view schematically illustrating a backlight unit according to a second exemplary embodiment of the present invention. FIG. 9 is a plan view schematically illustrating a light guide panel of the backlight unit of FIG. 8. In describing the backlight unit of FIG. 8 and FIG. 9, detailed explanation about the same elements as in the first exemplary embodiment will be omitted.

Referring to FIG. 8 and FIG. 9, the first block partitioning units 116 in the form of a groove are formed between the respective adjacent light guide blocks LGBi1, LGBi2, LGBi3, . . . (herein, 'i' is a natural number) partitioned in the first direction X, namely, in a direction parallel with the light emitting direction of the point light sources 120. The point light sources 120 (only the side views thereof are shown in FIG. 8) are received in the first block partitioning units 116 having the groove form. Thus, unlike the related art, border parts are not generated among the light guide blocks LGBi1, LGBi2, LGBi3, . . . by the first block partitioning units 116. Therefore, mura such as the bright lines and the dark lines that used to be generated in the related art structure can be prevented. In addition, the process of assembling the light guide blocks are simplified because the light guide blocks are integrated, not separated by the first blocking partitioning units 116. As a result, the processing time can be reduced and the light leakage by the assembling tolerance can be prevented.

The point light source may be classified as top-view light source or side-view light source. The top-view light source emits light toward the liquid crystal panel, whereas the side-view light source emits light perpendicular to the direction of the light from top-view light source. The point light sources of the first block partitioning unit in the exemplary embodiments are the side-view light source.

Second block partitioning units 136 are formed between respective adjacent light guide blocks LGB1j, LGB2j, LGB3j, LGB4j, . . . (herein, 'j' is a natural number) partitioned in the second direction Y perpendicular to the first direction X, namely, in a direction perpendicular to the light emitting direction of the point light sources 120. The second block partitioning units 136 have a hole form, thereby separating the light guide blocks LGB1j, LGB2j, LGB3j, LGB4j, . . . adjoining in the second direction Y. Here, the second block partitioning units 136 may form a matrix structure with the first block partitioning units 116 in a square, diagonal, or random direction.

The point light sources 120 are not disposed at the regions corresponding to the second block partitioning units 136. The light generated from the point light sources 120 disposed at the regions corresponding to the first point light sources 116 is not incident to the second block partitioning units 136. Therefore, the occurrence rate of mura such as bright lines and dark lines can be prevented at the light guide blocks LGB1j, LGB2j, LGB3j, LGB4j, . . . adjoining in the second direction Y with the second block partitioning units 136 disposed among them. In particular, as shown in FIG. 5, the optical patterns 112 including at least one of a dot pattern and a prism pattern may be formed at least one of the upper surface and the lower surface of the respective light guide blocks LGB. Thus, the light is not incident to the regions corresponding to the second block partitioning units 136. Straightness of the light incident to the light guide blocks LGB can be improved by the optical patterns 112. Accordingly, although the light guide blocks LGB 1j, LGB 2j, LGB 3j, . . . adjoining in the second direction Y are separated, emission of the light toward the light guide blocks LGB 1j, LGB 2j, LGB 3j, . . . can be prevented, thereby preventing mura such as bright lines and dark lines from generating at board parts among the light guide blocks LGB 1j, LGB 2j, LGB 3j, . . . .

Figure 10:
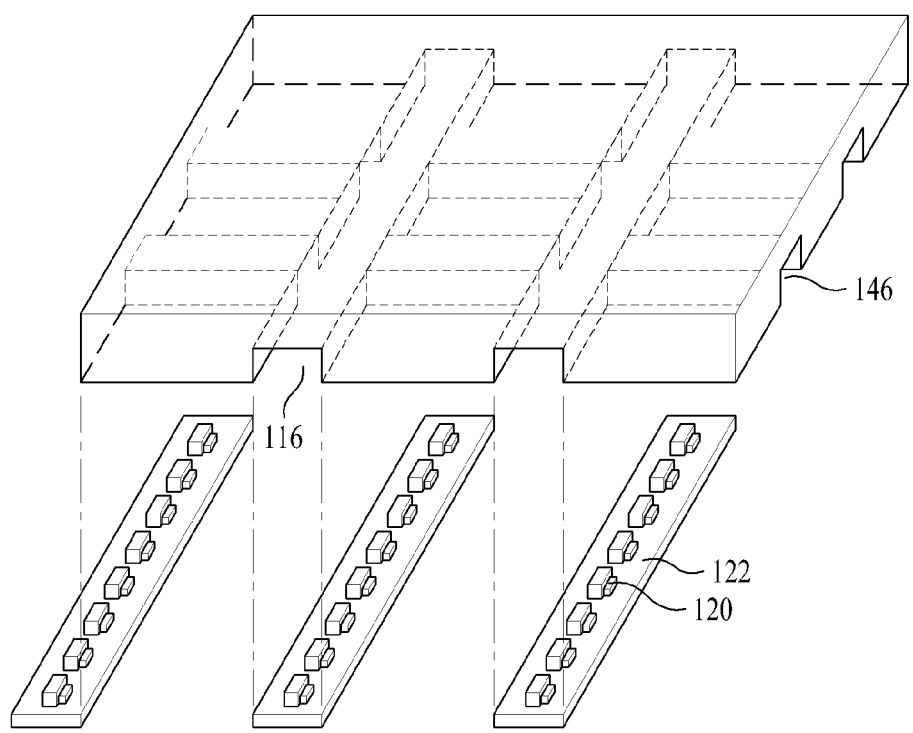
FIG. 10 is a perspective view schematically illustrating a backlight unit according to a third exemplary embodiment of the present invention.
Figure 11:
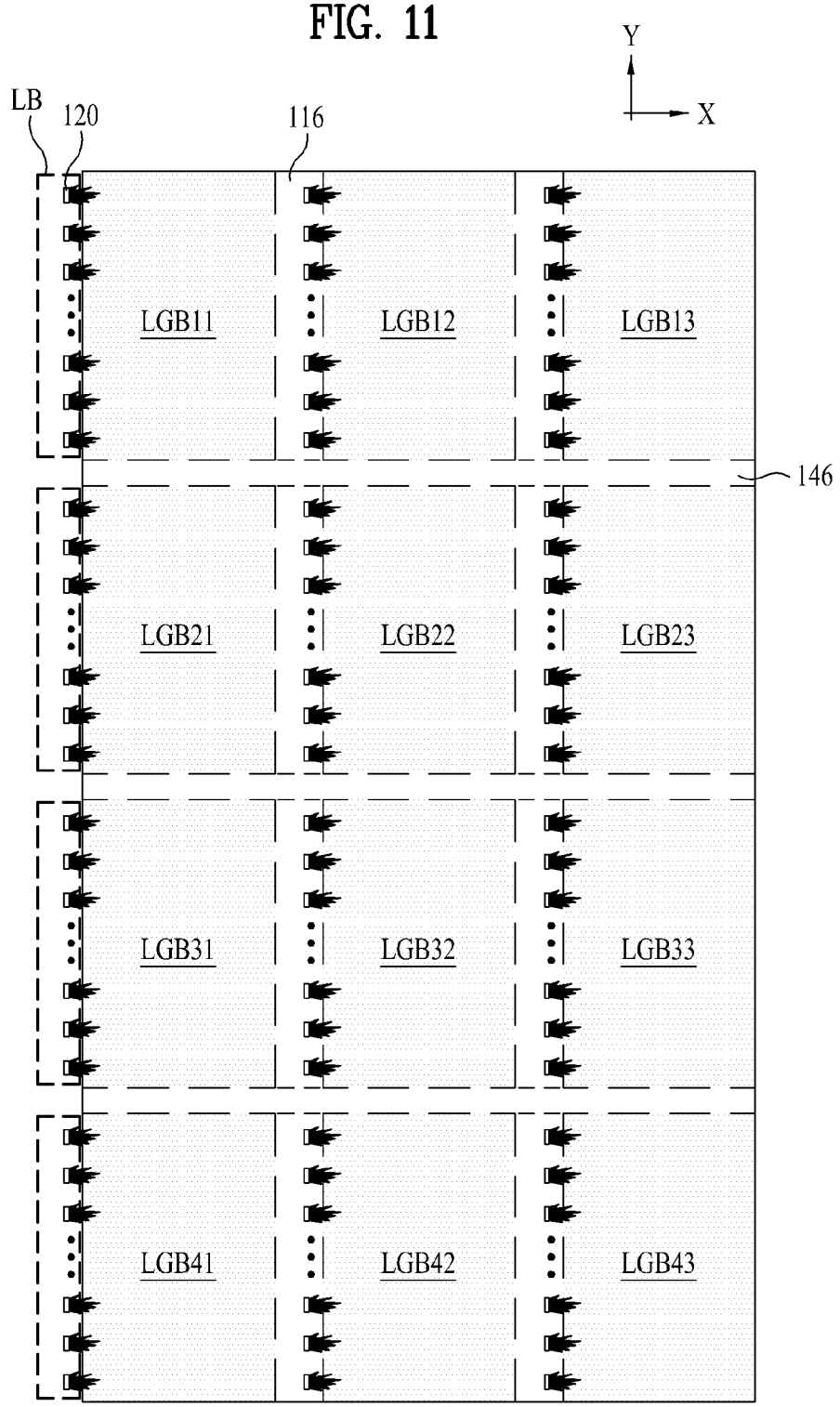
FIG. 11 is a plan view schematically illustrating a light guide panel of the backlight unit of FIG. 10.

FIG. 10 is a perspective view schematically illustrating a backlight unit according to a third exemplary embodiment of the present invention. FIG. 11 is a plan view of a light guide panel of the backlight unit of FIG. 10. In describing the light guide panel of the backlight unit shown in FIG. 10 and FIG. 11, detailed explanation about the same elements as in the first exemplary embodiment will be omitted.

Referring to FIG. 10 and FIG. 11, the first block partitioning units 116 in the form of a groove are formed between the respective adjacent light guide blocks LGBi1, LGBi2, LGBi3, . . . (herein, 'i' is a natural number) partitioned in the first direction X, namely, parallel with the light emitting direction of the point light sources 120. The side-view point light sources 120 are received in the first block partitioning units 116 having the groove form.

Second block partitioning units 146 are formed between respective adjacent light guide blocks LGB1j, LGB2j, LGB3j, LGB4j, . . . (herein, 'j' is a natural number) partitioned in the second direction Y perpendicular to the first direction X, namely, in a direction perpendicular to the light emitting direction of the point light sources 120. The second block partitioning units 146 may be each formed as a groove having the same height as or a different height from the first block partitioning units 116, thereby partitioning the light guide blocks LGB1j, LGB2j, LGB3j, LGB4j, ... adjoining in the second direction Y.

Unlike the related art, border parts are not generated between the respective light guide blocks LGB11, LGB12, ..., LGB21, LGB22, ..., LGB31, LGB32, ..., LGB41, LGB42, ... by the first and second block partitioning units 116 and 146 according to this exemplary embodiment. Therefore, generation of mura such as bright lines and dark lines can be prevented. In addition, assembling of the light guide blocks is not required since the light guide blocks LGB11, LGB12, ..., LGB21, LGB22, ..., LGB31, LGB32, ..., LGB41, LGB42, ... are not individually separated but integrally connected. Therefore, the whole processing time can be reduced, and the leakage of light caused by an assembling tolerance can be prevented.

Figure 12:
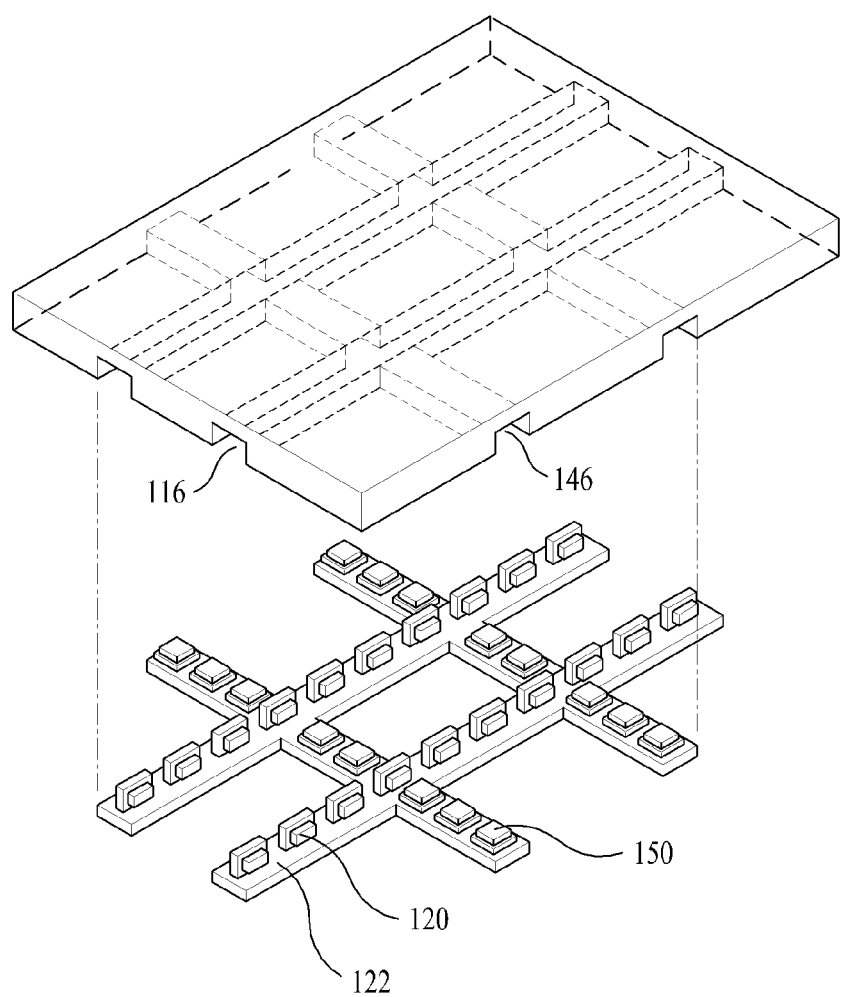
FIG. 12 is a perspective view schematically illustrating a backlight unit according to a fourth exemplary embodiment of the present invention.
Figure 13:
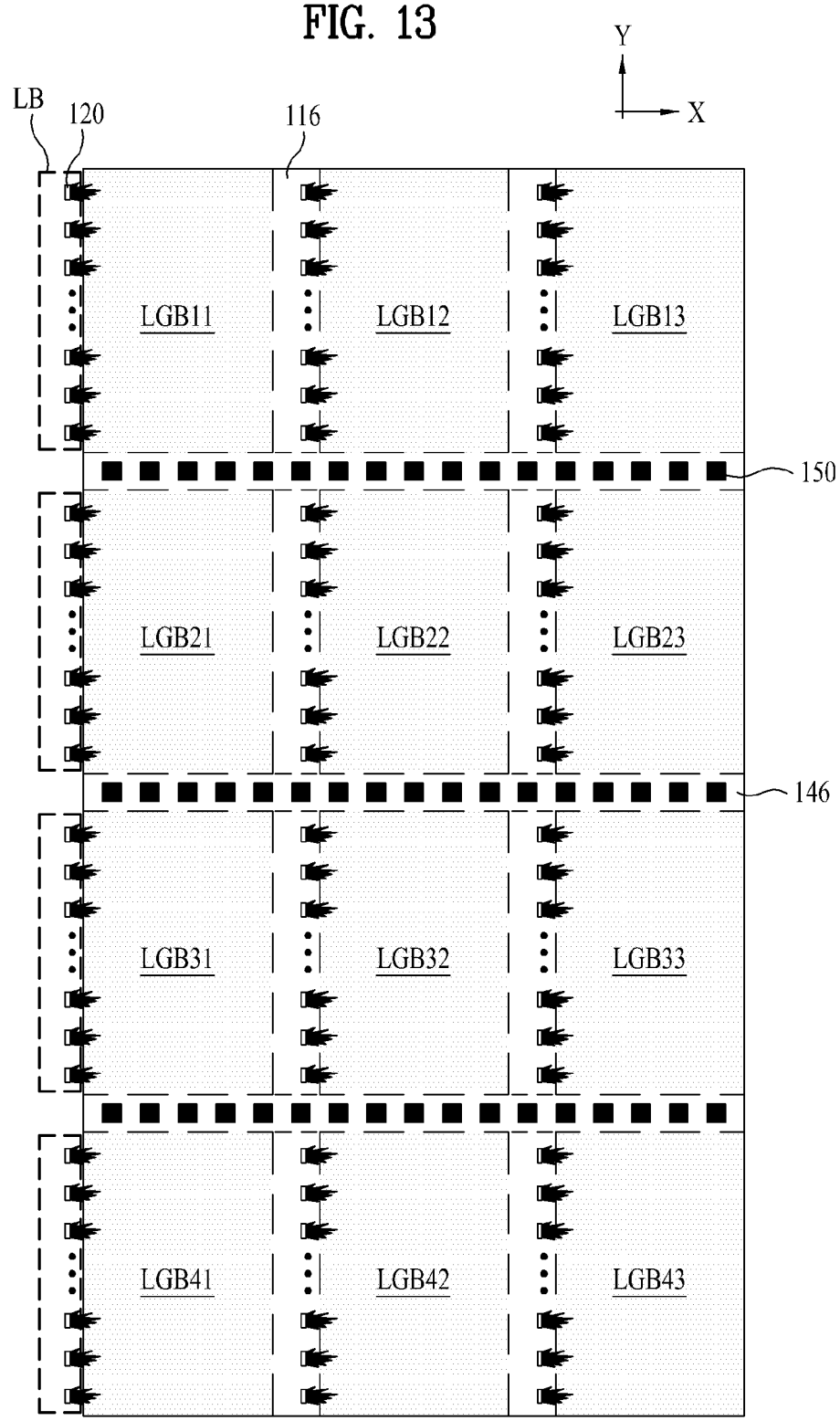
FIG. 13 is a plan view schematically illustrating a light guide panel of the backlight unit of FIG. 12.

FIG. 12 is a perspective view of a backlight unit according to a fourth exemplary embodiment of the present invention, and FIG. 13 is a plan view illustrating a light guide panel of the backlight unit of FIG. 12. In describing the light guide panel of the backlight unit shown in FIG. 12 and FIG. 13, detailed explanation about the same elements as in the previous exemplary embodiment will be omitted.

Referring to FIG. 12 and FIG. 13, the first block partitioning units 116 in the form of a groove are formed between the respective adjacent light guide blocks LGBi1, LGBi2, LGBi3, ... (herein, 'i' is a natural number) partitioned in the first direction X, namely, parallel with the light emitting direction of the point light sources 120. The side-view point light sources 120 in FIG. 12 are received in the first block partitioning units 116 having the groove form.

The second block partitioning units 146 are formed between respective adjacent light guide blocks LGB1j, LGB2j, LGB3j, LGB4j, ... (herein, 'j' is a natural number) partitioned in the second direction Y perpendicular to the first direction X, namely, in a direction perpendicular to the light emitting direction of the point light sources 120. The second block partitioning units 146 may be each formed as a groove having the same height as or a different height from the first block partitioning units 116, thereby partitioning the light guide blocks LGB1j, LGB2j, LGB3j, LGB4j, ... adjoining in the second direction Y. Second point light sources 150 are top-view light sources that emit light in a vertical direction to the LCD panel 140 of FIG. 2. The second point light sources 150 shown in FIG. 12 are received in the second block partitioning units 146. The second point light sources 150 are turned off during the local dimming driving, and turned on, except during the local dimming driving, in order to increase the intensity of light.

Unlike the related art, border parts are not generated between the respective light guide blocks LGB11, LGB12, ..., LGB21, LGB22, ..., LGB31, LGB32, ..., LGB41, LGB42, ... by the first and second block partitioning units 116 and 146 according to this exemplary embodiment. Therefore, generation of mura such as bright lines and dark lines can be prevented. In addition, assembling of these light guide blocks is not required since the light guide blocks LGB11, LGB12, ..., LGB21, LGB22, ..., LGB31, LGB32, ..., LGB41, LGB42, ... are not individually separated but integrally connected. Therefore, the whole processing time can be reduced, and the leakage of light caused by an assembling tolerance can be prevented.

Figure 14:
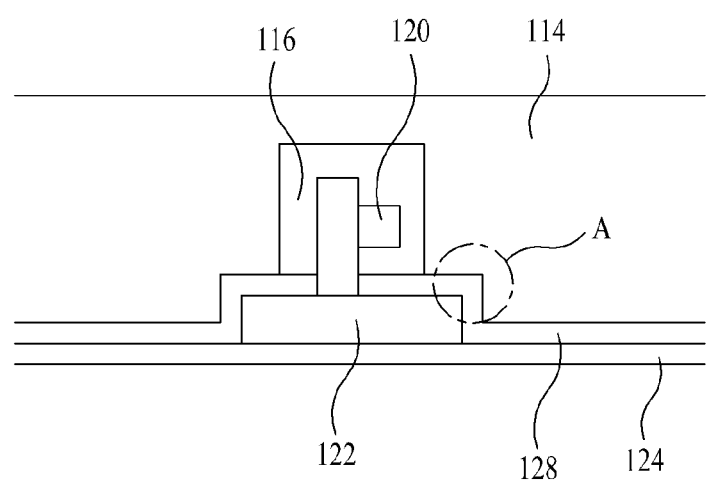
FIG. 14 is a sectional view specifically schematically illustrating a contacting area between a reflection sheet and a light guide panel of the backlight unit according to the exemplary embodiments of the present invention.

FIG. 14 is a sectional view specifically illustrating a contacting area between a reflection sheet and a light guide panel of the backlight unit according to the above-described exemplary embodiments of the present invention. As shown in FIG. 14, the reflection sheet 128 may be formed on the light source substrate 122 and the bottom cover 124. Therefore, the reflection sheet 128 may have a stepped form at portions "A" corresponding to corners of the light source substrate 122. Also, the light guide panel 114 may be bent at portions corresponding to the portions "A" of the reflection sheet 128 so as not to increase the whole thickness of the LCD module.

The light guide panel of the backlight unit according to these exemplary embodiments described above may be applied to a mobile device, a notebook, a monitor, a television and so on employing a backlight unit. As apparent from the above description, in accordance with the backlight unit according to any one of the above-described exemplary embodiments of the present invention, respective light guide blocks are interconnected in an integrated form with block partitioning units interposed among them in the form of grooves rather than being individually separated.

Therefore, a dedicated process for assembling the light guide blocks may be omitted, thereby reducing the processing time and preventing leakage of light caused by an assembling tolerance. Moreover, since the backlight unit according to the exemplary embodiments of the present invention does not generate border parts in the form of a hole as in the related art, deterioration of the image quality by bright lines or dark lines caused at the border parts may be prevented.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A backlight unit comprising:
 a light guide panel;
 at least two first block partitioning units formed as a groove on a lower surface of the light guide panel, wherein the at least two first partitioning units have a polygonal section that includes one slanted surface and one incident part facing each other;
 a plurality of light guide blocks formed by partitioning the light guide panel, wherein the light guide blocks are integrated, not separated by at least two first partitioning units,
 at least two point light sources received in the at least two first block partitioning unit, and constituting one light block corresponding to one of the plurality of light guide blocks,
 at least one second block partitioning unit that has a hole or groove form, wherein a length of the at least one second block partitioning unit is arranged in a perpendicular direction to a length of the at least two first block partitioning units; and
 at least one second point light source received in the at least one second block partitioning unit and arranged in the perpendicular direction to the at least two first block partitioning units, wherein the second point light source is turned off during a local dimming driving and turned on except during the local dimming driving,
 wherein a width of the groove surrounded with the slanted surface and the incident part is formed to be gradually narrower as it goes from the lower surface of the light guide panel to an upper surface of the light guide panel; and
 wherein lights generated from the point light sources are directly incident to the incident part and are not directly incident to the slanted surface.

2. The backlight unit according to claim 1, wherein the plurality of light guide blocks are each formed with at least one of optical patterns on at least one of an upper surface and a lower surface of each of the plurality of light guide blocks.

3. The backlight unit according to claim 2, wherein the optical patterns include at least a dot pattern or a prism pattern.

4. The backlight unit according to claim 1, wherein the plurality of light guide blocks each include a surface exposed by the at least two first partitioning units, and the surface is planarized through a mirror surface processing with an improved light incident efficiency.

5. The backlight unit according to claim 1, wherein the at least one point light source is side-view light source.

6. The backlight unit according to claim 1, wherein the second point light source is a top-view light source.

7. A backlight unit comprising:
a light guide panel;
at least two first block partitioning units formed as a groove on a lower surface of the light guide panel, wherein the at least two first partitioning units have a polygonal section that includes one slanted surface and one incident part facing each other;
a plurality of light guide blocks formed by partitioning the light guide panel wherein the light guide blocks are integrated, not separated by at least two first partitioning units;
at least two point light sources received in the at least two first block partitioning units, and constituting one light block corresponding to one of the plurality of light guide blocks;
at least one second block partitioning unit that has a hole or groove form, wherein a length of the at least one second block partitioning unit is arranged in a perpendicular direction to a length of the at least two first block partitioning units; and
at least one second point light sources that are received in the at least one second block partitioning unit and are arranged in the perpendicular direction to the at least two first block partitioning units, wherein the second point light sources is turned off during a local dimming driving and turned on except during the local dimming driving,
wherein lights generated from the point light sources are directly incident to the incident part and are not directly incident to the slanted surface.

8. The backlight unit according to claim 7, wherein the second point light source is a top-view light source.

9. The backlight unit according to claim 7, wherein a width of the groove of the at least two first block partitioning units surrounded with the slanted surface and the incident part is formed to be gradually narrower as it goes from the lower surface of the light guide panel to an upper surface of the light guide panel.

* * * * *